United States Patent [19]

Abraham et al.

[11] Patent Number: 5,745,576
[45] Date of Patent: Apr. 28, 1998

[54] METHOD AND APPARATUS FOR INITIALIZATION OF CRYPTOGRAPHIC TERMINAL

[75] Inventors: Dennis G. Abraham, Concord, N.C.; Richard K. Hite, Manteca, Calif.

[73] Assignee: Visa International Service Association, Foster City, Calif.

[21] Appl. No.: 650,888

[22] Filed: May 17, 1996

[51] Int. Cl.$^6$ ...................................................... H04L 9/32
[52] U.S. Cl. ................................. 380/25; 380/21; 380/23
[58] Field of Search ................................. 380/21, 23, 24, 380/25; 902/2

[56] References Cited

U.S. PATENT DOCUMENTS

| | | |
|---|---|---|
| 4,238,853 | 12/1980 | Ehrsam et al. . |
| 4,288,659 | 9/1981 | Atalla . |
| 4,317,957 | 3/1982 | Sendrow ................... 380/25 |
| 4,578,530 | 3/1986 | Zeidler ...................... 380/24 |
| 4,630,201 | 12/1986 | White ....................... 380/24 |
| 4,677,670 | 6/1987 | Henderson, Jr. . |
| 4,771,461 | 9/1988 | Matyas . |
| 4,811,393 | 3/1989 | Hazard . |
| 4,888,800 | 12/1989 | Marshall et al. . |
| 4,912,762 | 3/1990 | Lee et al. .................. 380/24 |
| 4,933,969 | 6/1990 | Marshall et al. . |
| 4,933,971 | 6/1990 | Bestock et al. . |
| 4,984,270 | 1/1991 | LaBounty ................... 380/24 |
| 5,115,467 | 5/1992 | Esserman et al. . |
| 5,144,664 | 9/1992 | Esserman et al. . |
| 5,150,412 | 9/1992 | Maru ....................... 380/23 |
| 5,179,591 | 1/1993 | Hardy et al. . |
| 5,230,020 | 7/1993 | Hardy et al. . |
| 5,249,230 | 9/1993 | Mihm, Jr. .................. 380/23 |
| 5,323,465 | 6/1994 | Avarne ..................... 380/23 |
| 5,341,426 | 8/1994 | Barney et al. . |
| 5,341,427 | 8/1994 | Hardy et al. . |
| 5,351,296 | 9/1994 | Sullivan . |
| 5,369,705 | 11/1994 | Bird et al. . |
| 5,381,479 | 1/1995 | Gardeck et al. . |
| 5,384,848 | 1/1995 | Kikuchi . |
| 5,661,806 | 8/1997 | Nevoux et al. ............. 380/25 |

OTHER PUBLICATIONS

Carl H. Meyer and Stephen M. Matyas; Cryptography: A New Dimension In Computer Data Security; A Guide for the Design and Implementation of Secure Systems (pp. 271–299).

TG7: *Initial DEA Key Distribution for PIN Entry and Transaction Originating Devices*, Feb. 10, 1993, (pp. 1–25).

G.P. Double, *Physical Security for the IBM Transaction Security System*, May 6, 1991, (pp. 1–35).

*Primary Examiner*—Gilberto Barron, Jr.

[57] ABSTRACT

The present invention provides a method and apparatus for initializing cryptographic terminals in a cryptographic system. The invention provides a base key that is common to all controllers produced by a manufacturer of cryptographic systems. The base key is installed by the manufacturer of cryptographic terminals in each controller prior to shipment of the controllers. The base key is used only for the purposes of initialization of cryptographic terminals, and is not used for normal operations. Each cryptographic terminal that is to be used with any of the controllers containing the common base key is provided with an initial key by the manufacturer of the terminal. Each initial key is derived from the particular terminal's serial number and the common base key. The initial key is used only for initialization purposes and not for system operation. The terminal and controller establish communications in a normal manner using whatever communication protocol is appropriate for them. Upon installation, the controller and terminal enter into communications whereby the controller is able to securely determine the initial key contained in the terminal since the controller contains the base key.

23 Claims, 5 Drawing Sheets

METHOD AND APPARATUS FOR INITIALIZATION OF CRYPTOGRAPHIC TERMINAL

BACKGROUND OF THE PRESENT INVENTION

1. Field of the Invention

This invention relates to the field of cryptographic systems.

2. Background Art

There are a number of environments and applications that employ one or more terminals that receive data and provide data to a central location or controller. Often it is desired to protect the data that is transmitted from a terminal to the controller. This can be accomplished by encrypting the data prior to transmission.

One example of such an environment is a gasoline station that uses pumps at which a customer can pay by credit card or debit card. Each pump is coupled to a central controller that processes financial transactions initiated at the pump. The transactions typically involve the use of confidential data, such as a credit card number or personal identification number (PIN) of a customer. To maintain confidentiality of the PIN and other data, the transmission of the confidential data should be "secure". One way to accomplish this is to equip the pumps with cryptographic terminals in a cryptographic system.

A cryptographic system is a system for sending a message from a sender to a receiver over a medium so that the message is secure, that is, so that only the intended receiver can recover the message. A cryptographic system converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure. Current practice requires that PINs be transmitted in encrypted form to prevent theft during transmission.

A symmetric or reversible "classical" cryptosystem is a cryptosystem in which the enciphering information can be used to determine the deciphering information. To provide security, a classical cryptosystem requires that the enciphering key be kept secret and provided to users of the system over secure channels, such as secret couriers, or the like. These secure channels are often impractical and expensive. As a result, many cryptographic systems risk security breaches by transmitting secure information over a nonsecure channel.

In the system described above, each pump provides encoding of sensitive data using a "base key" that is common to the system. When a PIN or other sensitive data is entered into the terminal, the data is encrypted utilizing an encryption scheme, for example, the Data Encryption Algorithm (DEA) defined in ANSI X3.92 and transmitted to the controller. The base key is unique to the cryptographic system and is used by all of the terminals in the system. Each terminal stores the base key in local secure storage and uses it for transactions.

A problem arises in the prior art cryptographic system described above when a cryptographic terminal is repaired, replaced, or added to the system. If a component of the terminal fails, a replacement part is installed. In other circumstances an entire terminal is replaced, or additional terminals are added to the system. In any case, an initialization process must take place to enable the new cryptographic component or terminal to function with the system. As used herein, initialization comprises the process of transferring, in a secure manner, a key into a terminal.

In the initialization process, the new part or terminal does not have the base key that is common to the other cryptographic terminals in the cryptographic system. The base key must therefore be entered into the new cryptographic equipment. In the prior art, this has been accomplished by invoking an initialization procedure on the new part or terminal. This initialization procedure takes the installer through a series of steps, including one that requests the base key of the system to which the new part or terminal will be added. The base key often is provided to the technician or installer who is performing the initialization process so that it can be entered into the local storage of the new part or terminal. The installer may not be authorized to receive such information and may compromise the security of the system some time after installation, or may transfer the base key to third parties for fraudulent or unauthorized use. In other cases, the base key is transmitted electronically from the controller to the new cryptographic equipment in cleartext form over a nonsecure channel, such as a transmission line, risking detection by electronic monitoring.

Thus, current prior art cryptographic systems have a disadvantage of risking detection of the base key by unauthorized personnel during repair, replacement, or addition of cryptographic terminals to the system.

The following patents discuss communication of data between terminals in cryptographic systems.

U.S. Pat. No. 5,351,296 to Sullivan describes a method and device for determining and securely transmitting an account code of a financial card over a communications link in a communications network to a remote location which also allows concurrent voice communication over the same communications link. Sullivan provides an electronic device which can be attached to, and powered by, a communications device such as a telephone. The device has preprogrammed into it a secret master key that is known to a central location, and a nonsecret identity offset that also corresponds to the master key. A lookup table is maintained at the central location and associates the master key to the nonsecret identity offset. The identity offset, master key, and lookup table are used to generate a working key common between the central location and the device. This working key is used to encrypt the account code for transmission over the normally non-secure telephone line. Because the working key is generated independently at each location and is not transmitted over the nonsecure channel, the transaction can remain secure.

Bestock et al. U.S. Pat. No. 4,933,971, discloses a method for encrypting data for communication between a host computer and each of a number of remote terminals in a network. According to Bestock's method, a unique dynamic encryption key is periodically generated for each of the remote terminals. The unique dynamic encryption key is generated using a "system seed key" residing only in the host computer. The unique dynamic encryption key is used by each of the remote terminals in encrypting the data transmitted by each of the remote terminals to the host computer. The unique dynamic encryption key is also used by each of the remote terminals to decrypt the data received from the host computer. Bestock generates its "unique dynamic encryption key" as a current operation key for the purpose of protecting actual transaction data communicated between the host computer and each of the remote terminals.

Esserman et al, U.S. Pat. No. 5,115,467, discloses a signal encryption apparatus for generating a "common key" and a "distinct key" from a secret key. The signal encryption apparatus is installed at the uplinks used by different satellite television programmers. All sites share the same common key, however, the distinct key is unique to each site. The distinct key and common key are changed from time to time by changing the "distinct parameter data" and "common parameter data," respectively. The common parameter data defines a category of satellite television subscribers receiving encrypted signals. The distinct parameter data defines specific programs received by each satellite television subscriber. Esserman '467 addresses secure satellite transmission of television signals to subscribers based on category of subscribers and specific television programs.

U.S. Pat. No. 5,144,664 to Esserman et al '664, discloses a communication network with a number of terminals. Each terminal includes a "replaceable security element" having a security algorithm. If the security algorithm is compromised, the security element is replaced with a new security element containing a different algorithm.

Hardy et al, U.S. Pat. No. 5,179,591, Hardy et al, U.S. Pat. No. 5,230,020, and Hardy et al, U.S. Pat. No. 5,341,427 ("the Hardy patents") disclose a method for cryptographic communication with different types of user equipment employing differing cryptographic algorithms. According to the Hardy patents, a control means automatically determines which one of a number of cryptographic algorithms to employ for communication with different types of user equipment.

U.S. Pat. No. 4,238,853 to Ehrsam et al discloses a cryptographic communication system for data transmission between remote terminals and a host. The remote terminals and the host are capable of performing a variety of cryptographic operations. At initialization time, the host generates a series of "terminal master keys" for the remote terminals. The terminal master keys are then written into the data security devices of the respective remote terminals to permit cryptographic operations to be performed.

U.S. Pat. No. 4,288,659 to Atalla discloses use of a secret code, for example a Personalized Individual Number (PIN), at a remote terminal by an authorized individual. The PIN is combined with an identification number for the remote terminal and a sequence number to produce a code which is transmitted to a central processor. The central processor can independently generate the code since the processor also possesses the PIN, the identification number, and the sequence number. The code transmitted from the remote terminal and the code generated by the central processor are then compared for parity. Upon a match, a communication session between the central processor and the remote terminal is authorized.

Henderson, U.S. Pat. No. 4,677,670, discloses a "paired-secure message identification" system for secure communication between two computers. The system eliminates the uncertainty of an originator about the identity of the recipient of an electronic communication. The message originator provides a guest identification module to the recipient. If return messages are to be sent, the recipient provides another module to the originator.

The Hazard patent (U.S. Pat. No. 4,811,393) discloses a method to verify a secret key recorded in computer cards. The method calculates a "diversified key" from a "basic key." The diversified key is recorded in the memory of the computer card. The diversified key is authenticated by an "exploitation system." The exploitation system authenticates the diversified key by use of the basic key which is also known to the exploitation system.

U.S. Pat. No. 4,888,800 to Marshall et al discloses a communication system wherein encrypted messages are passed between user terminals. The system first establishes a link between two terminals. One of the terminals sends a request to a "key distribution center" which then provides an encrypted key to both terminals. The encrypted key sent by the key distribution center are used by the two terminals to transmit data encrypting keys to each other. The data encrypting keys are used to encrypt the actual messages between the two terminals.

Marshall '969 (U.S. Pat. No. 4,933,969) discloses an information storage system in which a directory stores titles and pointers to areas of the system memory storing messages. To protect messages against unauthorized changes, a "message identification code" is calculated and stored in a register. If the message is changed a new message identification code is calculated. The message identification code is checked for authentication.

U.S. Pat. No. 4,912,762 to Lee et al discloses a method for encoding messages in a communication network. According to Lee, a first node in the communication network transmits and receives messages to and from a second node in the communication network. Each of the pairs of the first and second nodes has an identification code unique to that pair.

U.S. Pat. No. 5,341,426 to Barney et al discloses a method for establishing a communication link between two terminals. The communication link is established by exchanging a message between the two terminals. The message contains information describing encryption devices existing in the two terminals. The message also includes information describing communication modes available within the two terminals and user authentication information.

Bird et al (U.S. Pat. No. 5,369,705) discloses a method for providing user authentication in a changing network topology. According to Bird, "freshness information" and identity information are transmitted from each of a number of users in a group. A group key is then generated, and coded information derived from the group key is sent to each user in the group. Each unit of coded information is accompanied by an identifying tag so as to identify which of the users is to use the coded information.

Gardeck et al, U.S. Pat. No. 5,381,479, discloses a method for "rekeying" communication units over the air. A "managing key unit" generates a "key packet." The key packet which includes a unit key, a key alias, and a "key representation" is transmitted to a "fleet key unit." Upon the receipt of the key packet, the fleet key unit determines which communication units are to be rekeyed.

U.S. Pat. No. 5,384,848 to Kikuchi discloses an apparatus for secure data transmission during a session between a client terminal and a server. The client terminal issues a channel establishment command which includes a first encryption device and a first decryption device. The server responds to the channel establishment command by returning a message including a second encryption device and a second decryption device.

The Matyas patent, U.S. Pat. No. 4,771,461 discloses a method for initializing a number of cryptographic terminals in a network. A public key is generated for a key distribution center. Each terminal in the network is provided with a terminal identification known to the key distribution center, and the public key is stored in each terminal. A registration request is generated by a person responsible for initializing each terminal. The registration request is sent to the key distribution center. The registration request consists of the terminal's identification and the public key. After an expiration date, the registration process is disabled for that terminal.

SUMMARY OF THE INVENTION

The present invention provides a method and apparatus for initializing cryptographic terminals in a cryptographic system. The invention provides a base key that is common to all controllers produced by a particular manufacturer. The base key is installed by the manufacturer of cryptographic terminals in each controller prior to shipment of the controllers. The base key is used only for the purposes of initialization of cryptographic terminals, and is not used for normal operations. Each cryptographic terminal that is to be used with any of the controllers containing the common base key is provided with an initial key by the manufacturer of the terminal. Each initial key is generated from the particular terminal's serial number and the common base key. The initialized terminals can be shipped to any location having a controller that contains the common base key.

The initial key, or a key derived from it, is used only for initialization purposes and not for system operation. The terminal and controller establish communications in a normal manner using whatever communication protocol is appropriate for them. Upon installation, the controller and terminal enter into communications whereby the controller is able to securely determine the initial key contained in the terminal since the controller contains the base key.

The initial key in the terminal is unique to that terminal and would not provide any additional information that would result in compromising any other key. For example, the initial key is used by the controller to load a current operation key into the terminal. If the terminal uses Master Key Session key (MKSK), the terminal uses the current operation key sent by the controller as its master key. If the terminal uses Derived Unique Key Per Transaction (DUKPT), the current operation key provided by the controller is used for DUKPT key management. It is noted that the initial terminal key and the base key in the controllers are never themselves used for protecting transaction data.

DETAILED DESCRIPTION OF THE INVENTION

A method and apparatus for initializing cryptographic equipment in a cryptographic system is described. In the following description, numerous specific details, such as number of bits, execution time, etc., are set forth in detail to provide a more thorough description of the present invention. It will be apparent, however, to one skilled in the art, that the present invention may be practiced without these specific details. In other instances, well known features have not been described in detail so as not to obscure the present invention.

Figure 1:
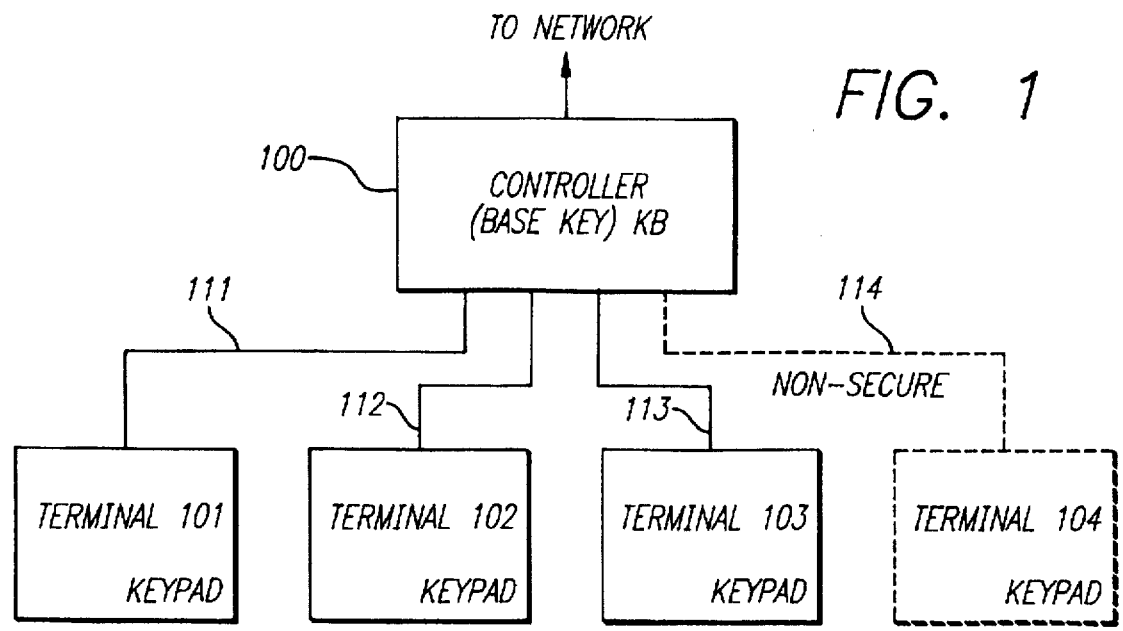
FIG. 1 is a block diagram of a cryptographic system.

A block diagram of a cryptographic system such as may be used with the present invention is illustrated in FIG. 1. The cryptographic system comprises a controller 100 coupled to terminals 101, 102, and 103. Each terminal includes a keypad through which a user may enter passwords, PINs, transaction amounts, etc. Terminals 101, 102, and 103 communicate with controller 100 through non-secure communications lines 111, 112, and 113 respectively. Alternatively, communication lines 111, 112, and 113 could be a single communications bus (secure or non-secure).

Communication between a terminal and the controller is encrypted using a transaction key. The transaction key is used to encrypt data using any of several well known encryption algorithms, such as DEA (data encryption algorithm). Often the data consists of a PIN entered at the keypad of the terminal which is transmitted in encrypted form to the controller 100. The PIN is encrypted using the transaction key, transmitted to controller 100, and then decrypted at controller 100 using the transaction key.

The problem of initialization of the cryptographic system of FIG. 1 occurs when, for example, one of the terminals 101–103 is replaced or repaired, such as by replacing a keypad of the terminal, or when a new terminal, such as terminal 104, is added to the system. Terminal 104 is shown prospectively coupled to controller 100 through communication line 104, illustrated as a dashed line in FIG. 1. The replacement keypad, or the new terminal, are unknown to the controller. Therefore, some way of identifying the new equipment as authorized to communicate with controller 100 must be provided. As noted above, the prior art methods of initializing a terminal in a cryptographic system risk compromising the base key.

The present invention provides a method of secure initialization of cryptographic terminals so that no secret data is transmitted in cleartext form. As used herein, the term "cryptographic terminal" includes "cryptographic terminals" as well as "cryptographic controllers" which also serve as "cryptographic terminals." For example, a system may have a plurality of levels of cryptographic controllers and cryptographic terminals. In the following description, consider that cryptographic terminals and replacement equipment are provided by a manufacturer. Also consider that a cryptographic system is acquired and used by a customer (there may be many customers that acquire cryptographic systems, the present invention works independently of the number of customers that there may be). Cryptographic terminals are repaired, replaced, or added to a system by an installer.

The manufacture associates a base key with all cryptographic equipment produced by that manufacturer. (In an alternate embodiment, the manufacturer associates a base key for each customer of cryptographic equipment. For example, the manufacturer makes cryptographic equipment for use by example customers Acme Company and Baker Company. The manufacturer installs a first base key into cryptographic equipment sold to Acme Company and a second base key into cryptographic equipment sold to Baker Company). This base key is maintained by security of the manufacturer and is stored in the cryptographic equipment in a physically secure manner to prevent unauthorized access of the base key. Schemes for providing physical security for cryptographic systems are well known. Examples of such schemes are described in "Physical Security for the IBM Transaction Security System" G. P. Double, IBM 1991, and in "Security Requirements for Cryptographic Modules" , FIPS PUB 140-1, U.S. Department of Commerce/National Institute of Standards and Technology, Jul. 13, 1990, both incorporated herein by reference.

Cryptographic terminals are initialized with an "initial terminal key" derived from the base key and the terminal device's serial number. As used herein, the term "serial number" refers generally to any unique identifying number. As used herein, where a processes refers to using an "initial terminal key" this includes the use of the actual "initial terminal key," as well as any key derived from the "initial terminal key." The initial terminal key is then stored in the cryptographic terminal. The initial terminal key is derived in such a way (using a one way function) that, even knowing the serial number of the terminal and the initial terminal key, it is not possible to derive the base key.

When the terminal is to be added to an existing cryptographic system, the controller enters into an initialization routine. The new terminal is placed in communication with the controller and the serial number of the controller (a non-secret value) is provided to the controller in cleartext form. The controller, using its secure base key, generates an initial terminal key which, since it is generated using the new terminal's serial number, is expected to match the initial terminal key stored in the new terminal. As used herein, the term "generate" includes producing a result based on a random component, as well as producing a fixed repeatable result through a process commonly referred to as "deriving." The controller uses the initial terminal key to encrypt communication with the new terminal. This initial key enables the controller to employ any of the well known challenge response protocols to verify the authenticity of the terminal. In one such protocol, for example, the controller encrypts a random number, using this initial key, and challenges the terminal to return the same random number modified in a predetermined manner to the controller, encrypted under the initial key, or under one derived from the established key. Optionally, the terminal may verify the authenticity of the controller using a similar mechanism.

When the identity and validity of the new terminal has been established by the challenges, the controller can provide, in encrypted form, the operational key to be used by the terminal for transactions between the controller and the new terminal. The new terminal is now part of the cryptographic system.

Creation of Initial Terminal Key

Figure 2:
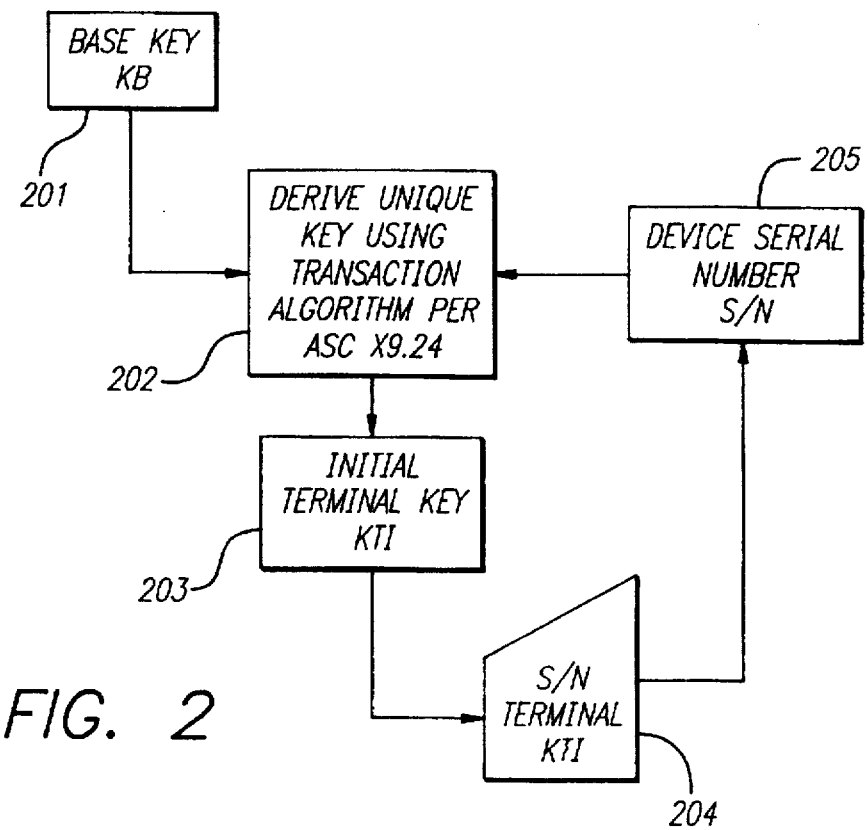
FIG. 2 illustrates the initialization process by which an initial terminal key is determined.

FIG. 2 illustrates the initialization process by which an initial terminal key is determined. A manufacturer selects base key 201 (KB) to be used with controllers provided, for example, to a particular customer. Terminal 204, intended for use with that particular customer, provides device serial number 205 (S/N) to initial key derivation process 202. Process 202 receives base key 201 and device serial number 205 as inputs and, using a derivation algorithm such as the Derived Unique Key Per Transaction (DUKPT) Algorithm per ASC X9.24, derives initial terminal key 203 (KTI). Initial terminal key 203 is then loaded into terminal 204, which can be shipped to any location having a controller that contains base key 201.

DUKPT is described in ANSI standard X9.24 (see "Financial Services Retail Key Management" American National Standard for Financial Services ANSI/ABA X9.24-1992, pp 36–50, attached as Appendix A). DUKPT is a key management technique intended for encrypting and protecting PIN information during transactions. In its intended form, DUKPT provides a unique key for each transaction in a system that uses PINs. By contrast, the present invention contemplates using DUKPT as a method for protecting a key in an initialization process of a cryptographic system.

Because the controller contains the base key, the controller is able to determine the initial terminal key in the terminal. Further, the controller can use the initial terminal key to determine the authenticity of the terminal and transfer the current operation key to the terminal. The key in the terminal is unique to that terminal and if compromised by an adversary, cannot be used to provide any additional information that would result in the compromise of any other key.

Validation of New Terminal

Figure 3:
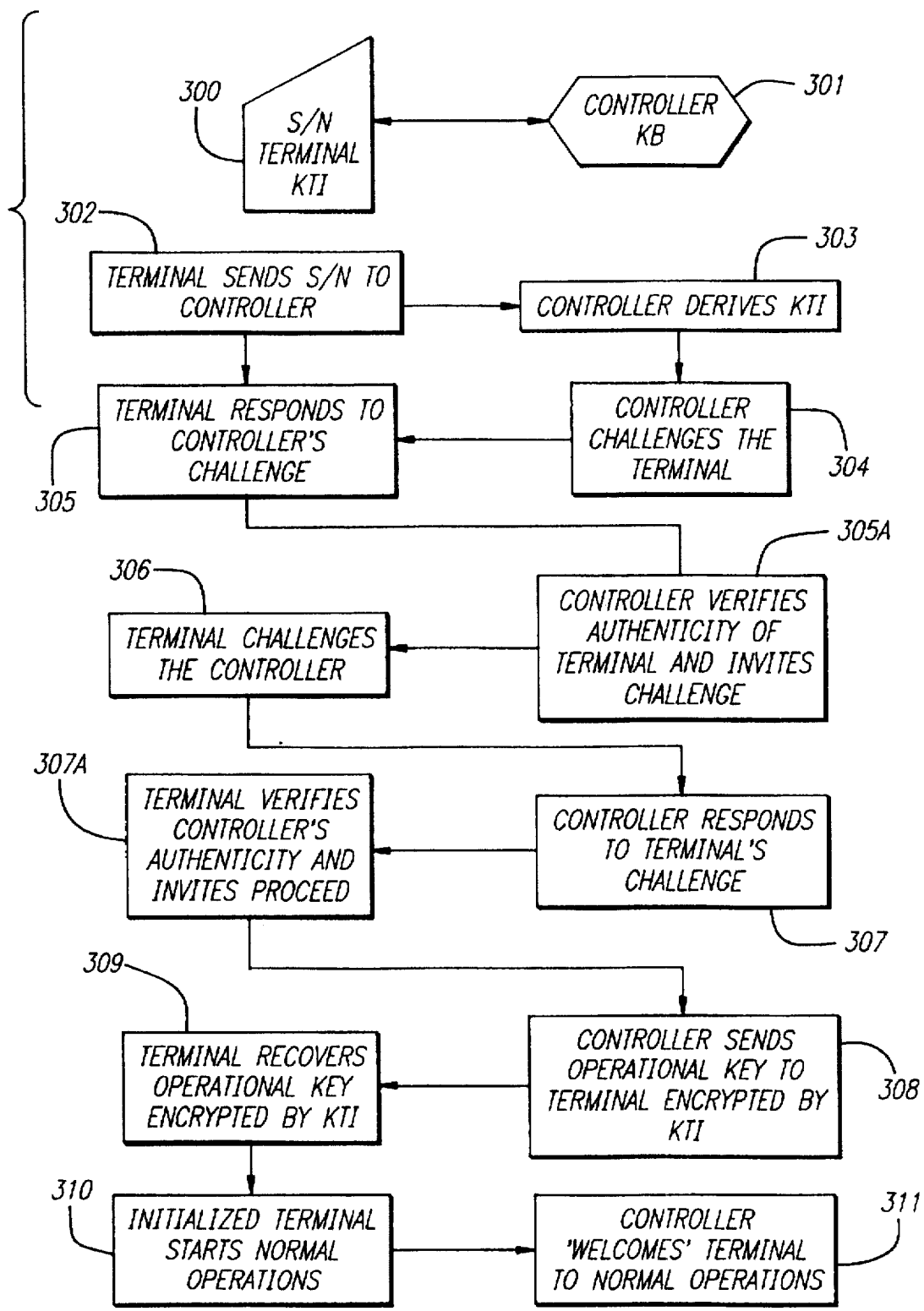
FIG. 3 illustrates one manner in which a terminal and a controller can establish communication.

FIG. 3 illustrates one manner in which a terminal (300) with an initial terminal key KTI and a controller (301) with the appropriate base key KB can establish communication. (Note, in FIG. 3, actions performed by the terminal are positioned in a vertical column below terminal 300. Actions performed by the controller are positioned in a vertical column below controller 301).

At block 302, terminal 300 sends its device serial number S/N to controller 301. The terminal 300 sends a transaction count and its serial number encrypted using the initial terminal key. At block 303, using the serial number S/N and the base key KB, controller 301 derives the initial terminal key KTI. The controller may also decrypt the ciphertext portion of the communication from terminal 300 to recover the serial number. At the following block 304, controller 301 sends a challenge to terminal 300 to verify the authenticity of the terminal. The terminal 300 decrypts the challenge sent by controller 301, and prepares the challenge response, and returns it to the controller 301 at block 305. If the response to the challenge is as expected, the terminal 300 is verified to controller 301 and the controller 301 invites a challenge from the terminal at block 305A. At block 306, terminal 300 sends a challenge to controller 301 to verify the authenticity of the controller.

At block 307 the controller responds to the challenge from terminal 300. At block 307A the terminal verifies the authenticity of the controller and invites the controller to proceed with the initialization process. At block 308, controller 301 sends the operational key encrypted with the initial terminal key KTI to terminal 300. At block 309, terminal 300 recovers the operational key and performs an initialization process appropriate to the key management technique being used. If the terminal uses Master Key Session Key (MKSK), the terminal uses the operational key sent by the controller as its Master Key. If the terminal uses DUKPT, the operational key provided by the controller is installed as the initial key to be used for DUKPT key management from the terminal. At block 310, the initialized terminal begins normal operations, and at block 311, controller 301 "welcomes" terminal 300 to normal operations.

Once communications have been established between the controller and the terminal, any of several cryptographic protocols could be used to establish authenticity of the terminal and controller as illustrated at blocks 304–307 of FIG. 3. For example, controller 301 can encrypt a random number using the initial terminal key and send it to terminal 300. Terminal 300 is expected to recover the random number, increment the value by one, encrypt the incremented value using the initial terminal key and return the result to controller 301. Controller 301 can then determine that terminal 300 possesses the initial terminal key. The test is repeated in the reverse direction with the terminal supplying an encrypted random number to the controller. The controller is expected to execute a similar protocol. Both devices are then assured that they are communicating with an authentic device.

In the preferred embodiment, the initial terminal key KTI and the base key KB are used only for the purpose of establishing the keys to be used for protecting transaction data and are never themselves used for protecting transaction data.

Flow Diagram

Figure 4:
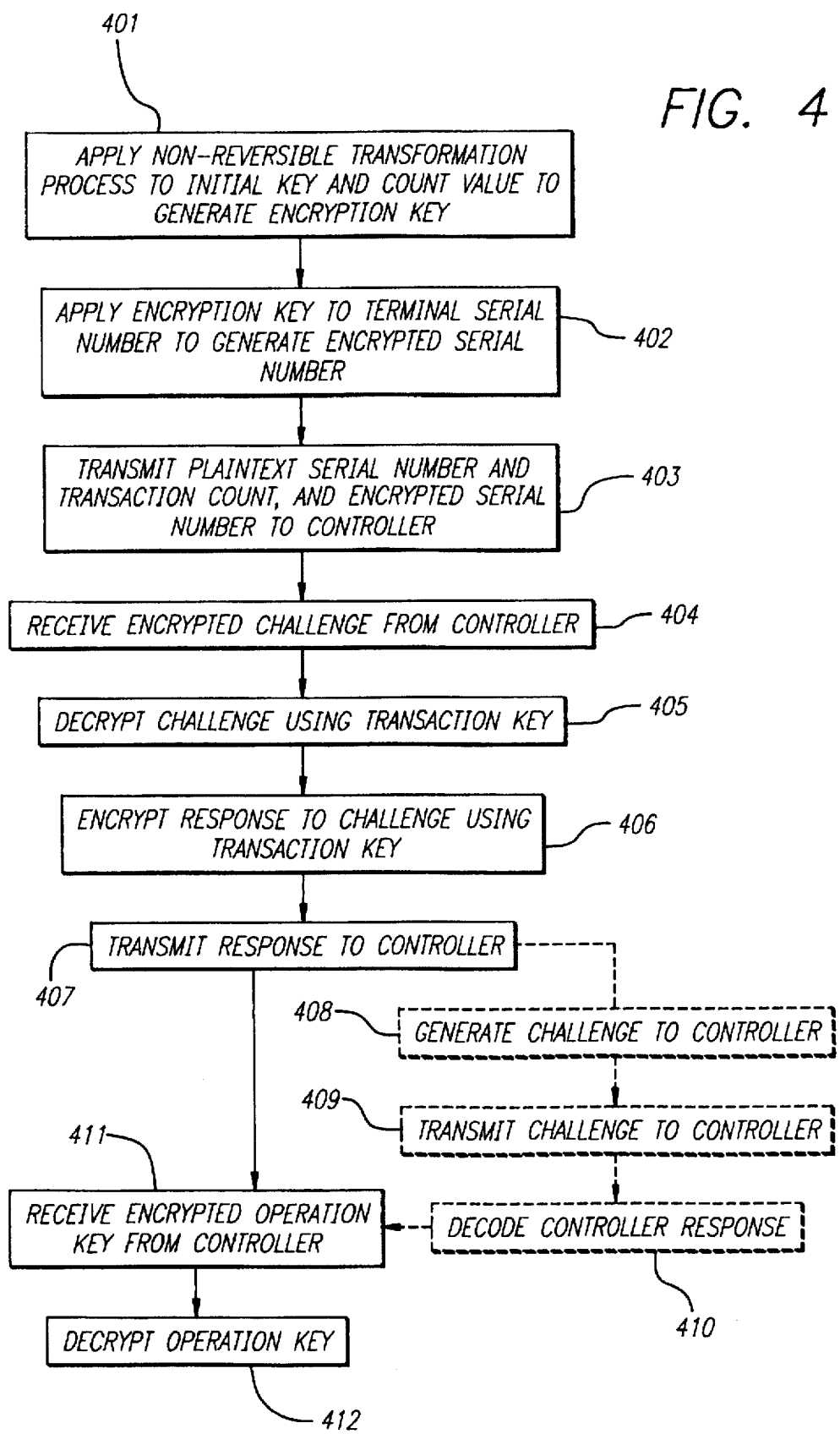
FIG. 4 is a flow diagram illustrating the operation of the terminal during initialization operation.

FIG. 4 is a flow diagram of the operation of the terminal during the initialization of the present invention. At step 401, the terminal applies a non-reversible transformation process to the initial key and a count value from its transaction counter to derive an encryption key. This encryption key is applied to the serial number of the terminal at step 402 to derive an encrypted serial number. At step 403 the serial number and transaction count in plaintext, and the encrypted serial number, are transmitted to the controller.

At step 404, the terminal receives an encrypted challenge from the controller. At step 405, the terminal decrypts the challenge using a transaction key derived from the initial key and the transaction count. The terminal encrypts a response to the challenge at step 406 using a transaction key derived from the initial terminal key, the transaction count, and the encrypted serial number modified in some predetermined manner, for example, incremented or decremented again by a predetermined amount. The response is transmitted to the controller at step 407.

At optional steps 408–410, the terminal derives a challenge to the controller using the initial key and transaction count, modified in some predetermined manner, for example, incremented or decremented by a predetermined amount. The terminal then transmits the challenge to the controller, and decodes the controller response when received.

At step 411, the terminal receives an encrypted operational key from the controller. At step 412 the terminal decrypts the operational key and uses that key for subsequent cryptographic operations.

Figure 5:
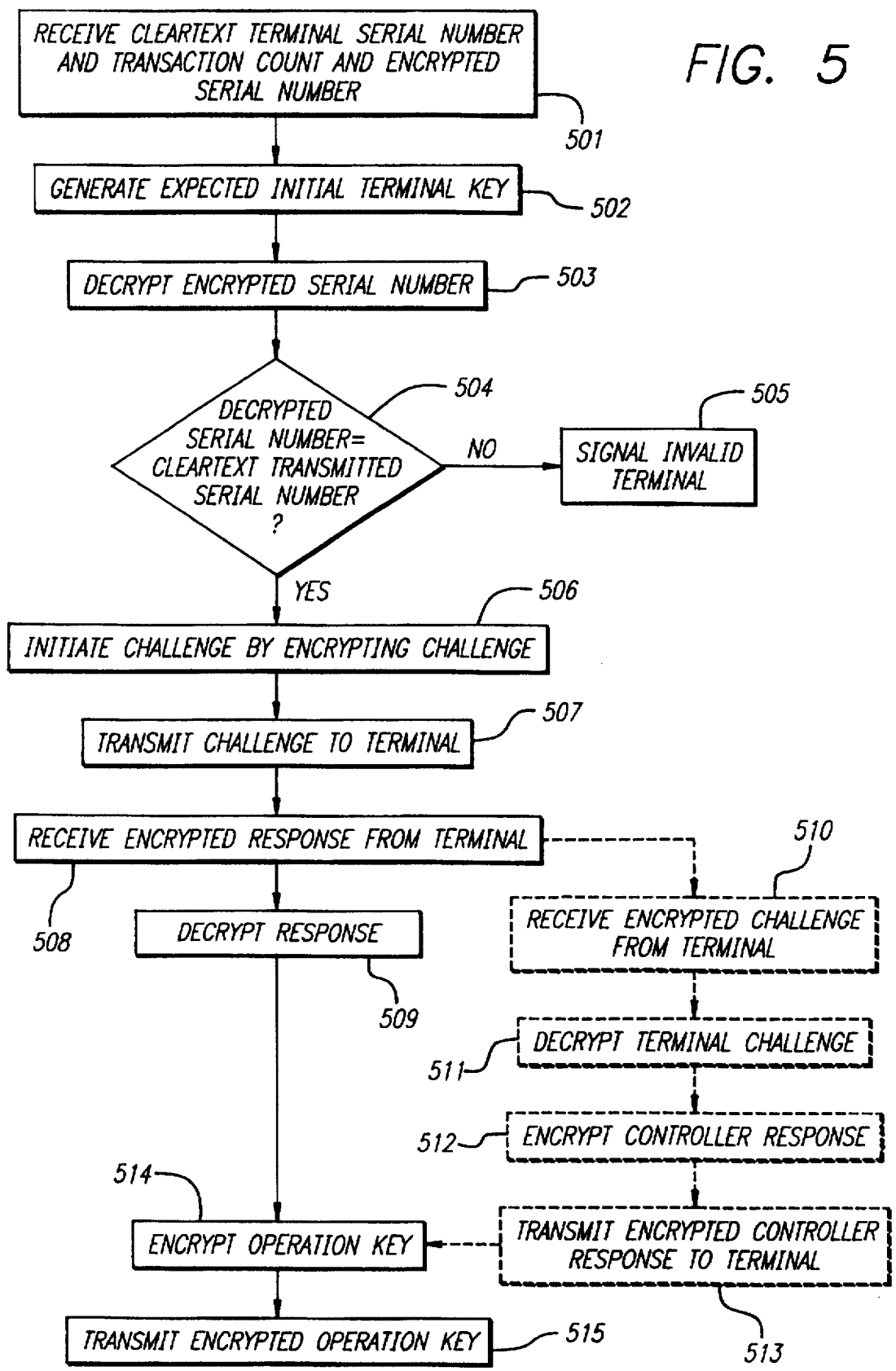
FIG. 5 is a flow diagram illustrating the operation of the controller during initialization operation.

Referring to FIG. 5, the flow of operation of the controller during the initialization process is illustrated. At step 501, the controller receives the terminal serial number and transaction count in cleartext form and the serial number encrypted. At step 502 the controller derives an expected initial terminal key using the base key and the serial number of the terminal. Using the expected initial terminal key and the transaction count, the controller decrypts the encrypted serial number at step 503.

At step 504, the controller compares the decrypted serial number to the cleartext form transmitted serial number to see if they match. (Alternatively, the controller can encrypt the serial number and compare the encrypted serial number to it). If there is no match, the controller signals in invalid terminal at step 505. If there is a match, the controller initiates a challenge at step 506 by encrypting the challenge using the expected initial terminal key, and the transaction count incremented or decremented by a predetermined value (i.e. "one") and transmits the challenge to the terminal at step 507.

At step 508, the controller receives an encrypted response from the terminal. At step 509 the controller decrypts the response using a key derived from the expected initial terminal key and the transaction count. At optional step 510, the controller receives an encrypted challenge from the terminal. At optional step 511 the controller decrypts the terminal challenge using the expected initial terminal key, and the transaction count incremented as necessary. At optional step 512 the controller encrypts a controller response to the terminal challenge using a key derived from the expected initial terminal count and the transaction count further incremented as necessary. At optional step 513 the controller transmits an encrypted controller response to the terminal.

At step 514, the controller encrypts an operation key using the expected initial terminal key and transaction count when the terminal has passed the controller challenge. At step 515 the controller transmits the encrypted operation key to the terminal.

Block Diagram

Figure 6:
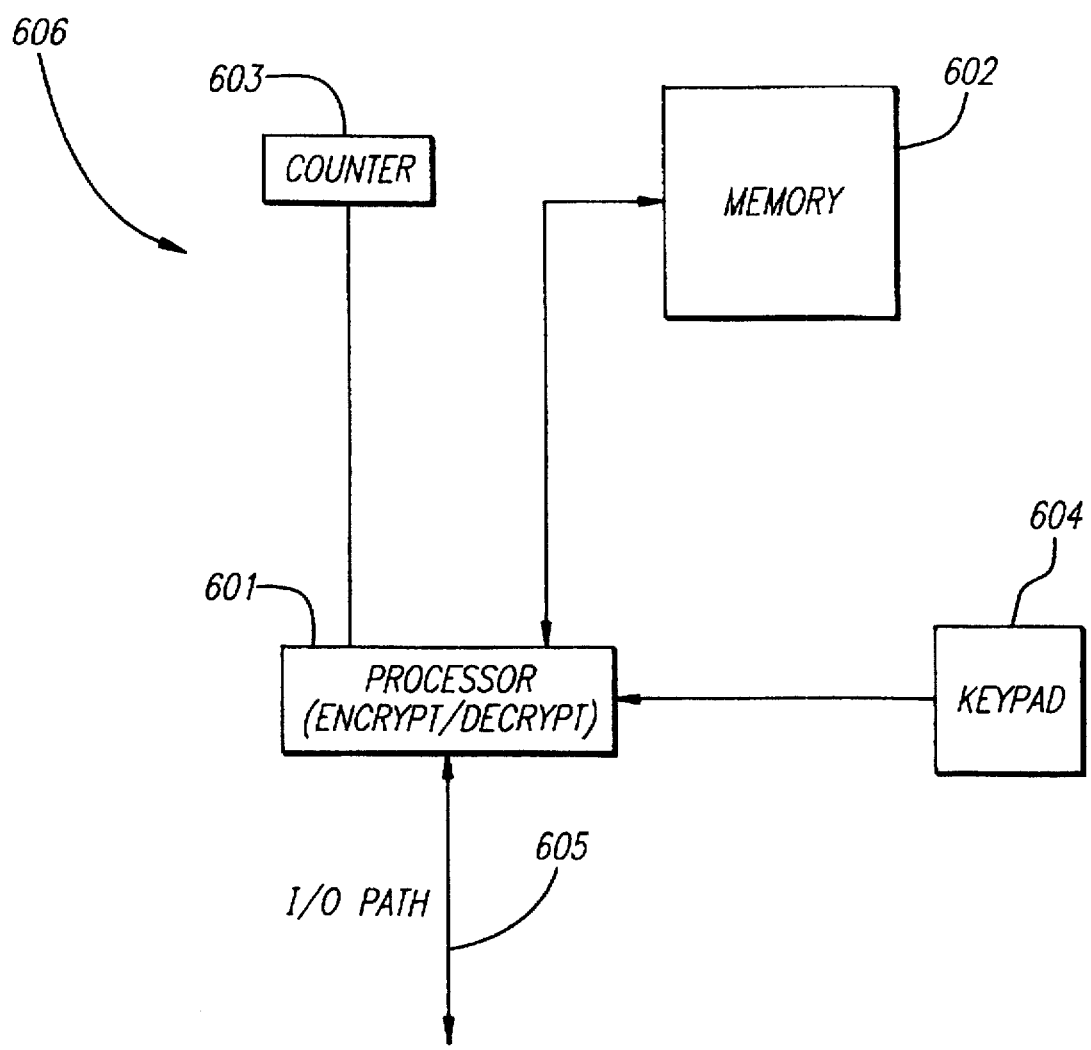
FIG. 6 is a block diagram of the a cryptographic device that may be used as a controller or terminal of the present invention.

FIG. 6 illustrates a block diagram of a cryptographic device that can be used as a controller or terminal. The device consists of a processor 601 that is used to perform cryptographic functions, including encryption and decryption, to derive keys, to compare values and to communicate with other devices and systems. The processor 601 is coupled to memory 602 that is used to store keys, such as the base key, the initial terminal key, etc. A counter 603 is coupled to processor 601 to provide a means of tracking transaction counts. An input device 604, such as a keypad, is used to introduce data into the processor 601. The processor 601 communicates with other devices and systems through input/output path 605.

The processor, counter, and memory may be made physically secure, indicated by dashed boundary 606. The physical security may be of any suitable manner that provides adequate security for a cryptographic system.

Thus, a method and apparatus for initialization of a cryptographic terminal have been described.

We claim:

1. A method for initializing a cryptographic terminal in a cryptographic system with an operational key comprising the steps of:

defining a base key for a cryptographic system;

storing said base key in a controller of said cryptographic system;

deriving an initial terminal key for a cryptographic terminal having a unique identifying number, said initial terminal key derived using said base key and said unique identifying number;

storing said initial terminal key in said cryptographic terminal;

establishing communication between said controller and said cryptographic terminal;

sending said unique identifying number from said cryptographic terminal to said controller;

at said controller, using a first processing means, deriving an expected initial terminal key using said unique identifying number and said base key;

encrypting a challenge message at said controller using said expected initial terminal key and transmitting said encrypted challenge message to said cryptographic terminal;

at said cryptographic terminal, using a second processing means, decrypting said encrypted challenge message using said initial terminal key;

encrypting a response message at said cryptographic terminal using said initial terminal key and transmitting said encrypted response message to said controller;

comparing said encrypted response message at said controller to an expected response message;

verifying said cryptographic terminal as an authentic cryptographic terminal when said response message matches said expected response message.

2. The method of claim 1 wherein said step of comparing said encrypted response message at said controller to an expected response message includes decrypting said encrypted response message at said controller.

3. The method of claim 1 further including the steps of:
encrypting a terminal challenge message at said cryptographic terminal using said initial terminal key and transmitting said encrypted terminal challenge message to said controller;
decrypting said encrypted terminal message at said controller using said expected initial terminal key;
encrypting a controller response message at said controller using said expected initial terminal key and transmitting said encrypted controller response to said cryptographic terminal;
decrypting said encrypted controller response message at said cryptographic terminal using said initial terminal key and comparing said controller response message to an expected controller response message;
verifying said controller as an authentic controller when said controller response message matches said expected controller response message.

4. The method of claim 1 further including the steps of:
encrypting an operation key at said controller using said expected initial terminal key and transmitting said encrypted operation key to said cryptographic terminal when said cryptographic terminal has been verified as an authentic terminal;
decrypting said encrypted operation key at said cryptographic terminal using said initial terminal key and using said operation key to encrypt messages between said controller and said cryptographic terminal.

5. The method of claim 1 wherein said base key is stored in said controller in a physically secure manner.

6. The method of claim 1 wherein said initial terminal key is derived using a Derived Unique Key Per Transaction (DUKPT) method.

7. The method of claim 1 wherein said expected initial terminal key is derived using a DUKPT method.

8. The method of claim of claim 1 wherein said step of deriving said initial terminal key includes the use of a transaction count.

9. The method of claim 1 wherein said step of deriving said expected initial terminal key includes the use of a transaction count.

10. A system for initializing a cryptographic terminal in a cryptographic system comprising:
a controller for storing a base key and for deriving an expected initial terminal key using said base key and a unique identifying number from a cryptographic terminal, said controller comprising;
a controller input device for inputting said base key;
a controller memory coupled to said controller input device for storing said base key;
a controller encrypter/decrypter coupled to said controller memory and said controller input device;
a controller input/output port coupled to said controller encrypter/decrypter;
a cryptographic terminal coupled to said controller comprising;
a terminal input device for inputting a unique identifying number of said cryptographic terminal;
a terminal memory storing an initial terminal key, said initial terminal key derived using said base key and said unique identifying number;
a terminal encrypter/decrypter coupled to said terminal memory and said terminal input device;
a terminal input/output port coupled to said terminal controller encrypter/decrypter.

11. The system of claim 10 wherein said controller input device comprises a keypad.

12. The system of claim 10 wherein said terminal input device comprises a keypad.

13. The system of claim 10 wherein said controller encrypter/decrypter is implemented in a microprocessor.

14. The system of claim 10 wherein said terminal encrypter/decrypter is implemented in a microprocessor.

15. An article of manufacture comprising:
a computer usable medium having computer readable program code means embodied thereon for causing an initialization process between a controller and a cryptographic terminal, the computer readable program code means in said article of manufacture comprising:
computer readable program code means for causing a computer to store a base key in a controller memory of said controller;
computer readable program code means for causing a computer to receive a unique identifying number from said cryptographic terminal;
computer readable program code means for causing a computer to derive an expected initial terminal key using said base key and said unique identifying number;
computer readable program code means for causing a computer to encrypt a controller challenge using said expected initial terminal key;
computer readable program code means for causing a computer to transmit said encrypted challenge to said cryptographic terminal; computer readable program code means for causing a computer to receive an encrypted terminal response, said encrypted terminal response encrypted using an initial terminal key stored in said cryptographic terminal and derived from said unique identifying number and said base key;
computer readable program code means for causing a computer to compare an expected response with said encrypted terminal response;
computer readable program code means for causing a computer to validate said cryptographic terminal when said decrypted response matches said expected response.

16. The article of manufacture of claim 15 further including:
computer readable program code means for causing a computer to decrypt said encrypted terminal response using said expected initial terminal key before comparing said expected response with said encrypted terminal response.

17. The article of manufacture of claim 15 further including:
computer readable program code means for causing a computer to encrypt an operation key and transmit said operation key to said cryptographic terminal.

18. The article of manufacture of claim 15 further including:
computer readable program code means for causing a computer to derive said expected initial terminal key using said base key, said unique identifying number, and a transaction count.

19. The article of manufacture of claim 15 further including:

computer readable program code means for causing a computer to receive an encrypted terminal challenge from said cryptographic terminal, said encrypted terminal challenge encrypted using said initial terminal key;

computer readable program code means for causing a computer to decrypt said encrypted terminal challenge using said expected initial terminal key;

computer readable program code means for causing a computer to encrypt a controller response encrypted using said expected initial terminal key;

computer readable program code means for causing a computer to transmit said encrypted controller response to said cryptographic terminal.

20. An article of manufacture comprising:

a computer usable medium having computer readable program code means embodied thereon for causing an initialization process between a controller and a cryptographic terminal, the computer readable program code means in said article of manufacture comprising:

computer readable program code means for causing a computer to store an initial terminal key in a terminal memory of said cryptographic terminal, said initial terminal key derived using a base key and a unique identifying number of said cryptographic terminal;

computer readable program code means for causing a computer to send said unique identifying number from said cryptographic terminal to a controller;

computer readable program code means for causing a computer to receive an encrypted challenge from said controller, said encrypted challenge encrypted using an expected terminal key derived using said base key and said unique identifying number;

computer readable program code means for causing a computer to decrypt said controller challenge using said initial terminal key;

computer readable program code means for causing a computer to encrypt a terminal response to said controller challenge using said initial terminal key;

computer readable program code means for causing a computer to transmit said encrypted terminal response to said controller;

computer readable program code means for causing a computer to decrypt said terminal response using said expected initial terminal key.

21. The article of manufacture of claim 20 further including:

computer readable program code means for causing a computer to receive an encrypted operation key from said controller;

computer readable program code means for causing a computer to decrypt said encrypted operation key using said initial terminal key.

22. The article of manufacture of claim 20 further including:

computer readable program code means for causing a computer to encrypt a terminal challenge using said initial terminal key;

computer readable program code means for causing a computer to transmit said encrypted terminal challenge to said controller;

computer readable program code means for causing a computer to receive an encrypted controller response from said controller, said encrypted controller response encrypted using an expected initial terminal key derived using said base key and said unique identifying number;

computer readable program code means for causing a computer to decrypt said encrypted controller response;

computer readable program code means for causing a computer to compare said controller response with an expected controller response;

computer readable program code means for causing a computer to validate said controller when said controller response matches said expected controller response.

23. The article of manufacture of claim 20 further including:

computer readable program code means for causing a computer to derive said initial terminal key using said base key, said unique identifying number, and a transaction count.

* * * * *